(12) United States Patent
Kim et al.

(10) Patent No.: US 7,818,454 B2
(45) Date of Patent: *Oct. 19, 2010

(54) HOST MIGRATION SYSTEM

(75) Inventors: Jooyong Kim, Des Plaines, IL (US); Jason Michael Abate, Chicago, IL (US)

(73) Assignee: Hostway Corporation, Chicago, IL (US)

( * ) Notice: Subject to any disclaimer, the term of this patent is extended or adjusted under 35 U.S.C. 154(b) by 1029 days.

This patent is subject to a terminal disclaimer.

(21) Appl. No.: 11/229,081

(22) Filed: Sep. 15, 2005

(65) Prior Publication Data

US 2007/0061462 A1 Mar. 15, 2007

(51) Int. Cl.
*G06F 15/16* (2006.01)

(52) U.S. Cl. ............ 709/245; 709/214; 709/225; 709/226; 709/227; 709/238

(58) Field of Classification Search .......... 709/245, 709/238

See application file for complete search history.

(56) References Cited

U.S. PATENT DOCUMENTS 5,774,660 A 6/1998 Brendel et al.
6,182,139 B1 1/2001 Brendel (Continued)

FOREIGN PATENT DOCUMENTS

WO WO 01/18641 A1 3/2001

(Continued)

OTHER PUBLICATIONS http://mail-archives.apache.org/mod_mbox/james-server-user/200404.mbox/%3C406D2D6A.10504@cox.net%3E.

(Continued)

*Primary Examiner*—Yves Dalencourt
(74) *Attorney, Agent, or Firm*—Brinks Hofer Gilson & Lione

(57) ABSTRACT

A host migration system having an first server, a second server and a relay server is provided. The first server is currently hosting an internet service having a predetermined domain name. The first server has a first IP address. The second server has a second IP address and the relay server has a third IP address. The first data packet of a request from users is redirected to the first server from the third server and a second data packet of the request is redirected to the second server from the third server. The data packet redirection may occur as an IP address mapped to the domain name is changed from the first IP address to the second IP address via the third IP address. The host migration system may provide substantially minimized downtime and data loss and corruption may be prevented.

12 Claims, 13 Drawing Sheets

U.S. PATENT DOCUMENTS

| | | | |
|---|---|---|---|
| 6,324,577 | B1 | 11/2001 | Hirai |
| 6,330,602 | B1 * | 12/2001 | Law et al. .................... 709/224 |
| 6,389,462 | B1 | 5/2002 | Cohen et al. |
| 6,470,389 | B1 * | 10/2002 | Chung et al. ................ 709/227 |
| 6,813,635 | B1 * | 11/2004 | Jorgenson ................... 709/225 |
| 7,302,541 | B2 | 11/2007 | Hirezaki et al. |
| 2002/0032798 | A1 * | 3/2002 | Xu ............................. 709/238 |
| 2004/0199609 | A1 | 10/2004 | Papatla et al. |
| 2004/0210583 | A1 | 10/2004 | Enko et al. |
| 2005/0086342 | A1 | 4/2005 | Burt et al. |
| 2006/0101113 | A1 | 5/2006 | Lemson et al. |
| 2006/0168334 | A1 * | 7/2006 | Potti et al. .................. 709/239 |
| 2006/0173968 | A1 * | 8/2006 | Vaarala et al. .............. 709/214 |
| 2008/0120433 | A1 * | 5/2008 | Cieslak et al. .............. 709/238 |

FOREIGN PATENT DOCUMENTS

| | | |
|---|---|---|
| WO | WO 02/054274 A1 | 7/2002 |
| WO | WO 2004/025925 A1 | 3/2004 |

OTHER PUBLICATIONS

"Making services easy to migrate: Virtual Addresses," http://www.debian-administration.org/articles/68, last visited on Sep. 15, 2005 (7 pages).

"Migrating from one Machine to Another," http://www.debian-administration.org/articles/169, last visited on Sep. 15, 2005 (10 pages).

The prosecution history of U.S. Appl. No. 11/517,041 show in the attached Patent Application Retrieval file wrapper document list, printed Jul. 14, 2009, including each substantive office action and/or applicant response.

Final Office Action of U.S. Appl. No. 11/517,041, mailed Nov. 9, 2009.

* cited by examiner

HOST MIGRATION SYSTEM

BACKGROUND

1. Technical Field

The invention relates to a host migration system and more particularly, to a host migration system with substantially minimized downtime.

2. Background Information

Hosting service providers supply internet services to users who desire to establish their presence on an internet. Internet services include, for example, web hosting services, email services, file transfer protocol (FTP) services, etc. Hosting service providers may be internet service providers that provide an internet access to clients. Alternatively, hosting service providers may focus on more professional hosting services after users have access to the internet. Hosting service providers also may supply domain name registration services as a registrar. Some users may host internet services with their computers at home.

Hosting service providers may have plural servers at their business place. The servers have storage that may be allocated to users who are using hosting services. The servers store user information, emails, communications, and other information as is needed by internet services. In particular, financial and privacy related information such as credit card numbers, passwords of customers, etc. may be stored in the storage of the servers. This type of information needs special protection from any data loss.

Internet users may have access to websites, send emails and transfer files at any time. There are no definite operation hours for internet services. Servers hosting internet services are required to have high uptime. For instance, users may be discouraged from visiting a website having frequent downtime. Hosting services may, however, experience unavoidable downtime. In particular, downtime frequently occurs upon migration of hosting servers. The migration may occur in the following situations. An existing server may require an improved load such as a load distribution regarding disk space, a memory usage, a central processing unit (CPU) usage, etc. The existing server also may be subject to hardware and software upgrade.

The migration also may happen when hosting service providers move in a new data center for business purposes. For example, the new data center may provide hosting service providers with reduced expenses and a better environment for equipment. In other situations, hosting service providers may be out of business so that hosting services are about to be terminated. Further, users may desire to change hosting service providers for various reasons such as low pricing, quality of services, etc.

The migration may cause substantial loss of data including emails, web contents, database contents, etc. In particular, when users of hosting services may engage in e-commerce, any data loss may be disastrous to their business. To minimize any downtime due to migration, hosting service providers may prepare a new server having preset configurations. A great amount of data at an existing server is copied to the new server. Subsequently, Domain Name Server (DNS) setting is changed so that an internet protocol (IP) address of internet services is changed to an IP address of the new server. Then, the existing server may be disabled.

Full propagation of this new IP address may take several hours to several days. The IP address of the existing server may be cached not only at multiple name servers but also at browsers of internet users. It may be difficult to expect when the cached IP address are renewed. During a certain time period, the IP address of the existing server may be still accessed by some internet users during propagation. Users may experience downtime of a hosting service when the existing server is disabled and the new server is activated. Although both the existing server and the new server are concurrently available, some users may provide new information to the existing server. This results in data corruption and data inconsistency. As a result, hosting services experiences unavoidable downtime.

BRIEF SUMMARY

By way of introduction only, in one embodiment, a host migration system includes a first server and a second server. The first server currently hosts an internet services having a predetermined domain name. The domain name has a first IP address, which is the IP address of the first server. A request from users relating to the domain name is directed to the first server. During the migration, the first IP address mapped for the domain name is changed to a second IP address of the second server. During this transition of the IP address, data packets may be redirected to at least one of the first server, or the second server. Data packet redirection may be performed with network address translation ("NAT") technique.

In other embodiment, a host migration system may include a relay server in addition to the first server and the second server. The relay server may be subject to the NAT configuration when the IP address of the domain name is changed during the migration. As a result, the relay server operates to redirect a data packet to the first server or the second server when the IP address of the domain name is changed. The downtime of the host migration system during the migration may be substantially reduced. Data loss and data corruption may be prevented.

In another embodiment, a host migration system includes a hosting server and a relay server. The hosting server is operable to host an internet service having a predetermined domain name. The hosting server has a variable IP address. The relay server has a predetermined IP address. The relay server operates to receive a request for the domain name and redirect a data packet from the request to the hosting server for transition of the IP address of the hosting server.

In another embodiment, a hosting migration system includes a first means, a second means and means for redirecting a data packet. The first means hosts an internet service having a predetermined domain name prior to migration, and the second means hosts the internet service subsequent to the migration. The means for redirecting operates to redirect the data packet of a request for the domain name during the migration. The means for redirecting is operable to format an address of the data packet.

In another embodiment, a migration method is provided for a host system operable to host an internet service having a predetermined domain name. In the method, a request for the domain name at a first server having a first IP address is received and responded. A content of the first server is copied to a second server having a second IP address. An IP address of the domain name is changed from the first IP address to the second IP address. A data packet is redirected to one of the first server and the second server during the change of the IP address of the domain name.

In another embodiment of a host migration method, an IP address of a hosting server operable to host an internet service having a predetermined domain name is changed. A request for the domain name is received at a relay server. A data packet from the request is redirected to the hosting server. In the host migration method, the hosting server is moved from one location to the other location. Alternatively, the internet service is hosted with a dynamic host configuration protocol (DHCP) server.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS AND THE PRESENTLY PREFERRED EMBODIMENTS

Figure 1:
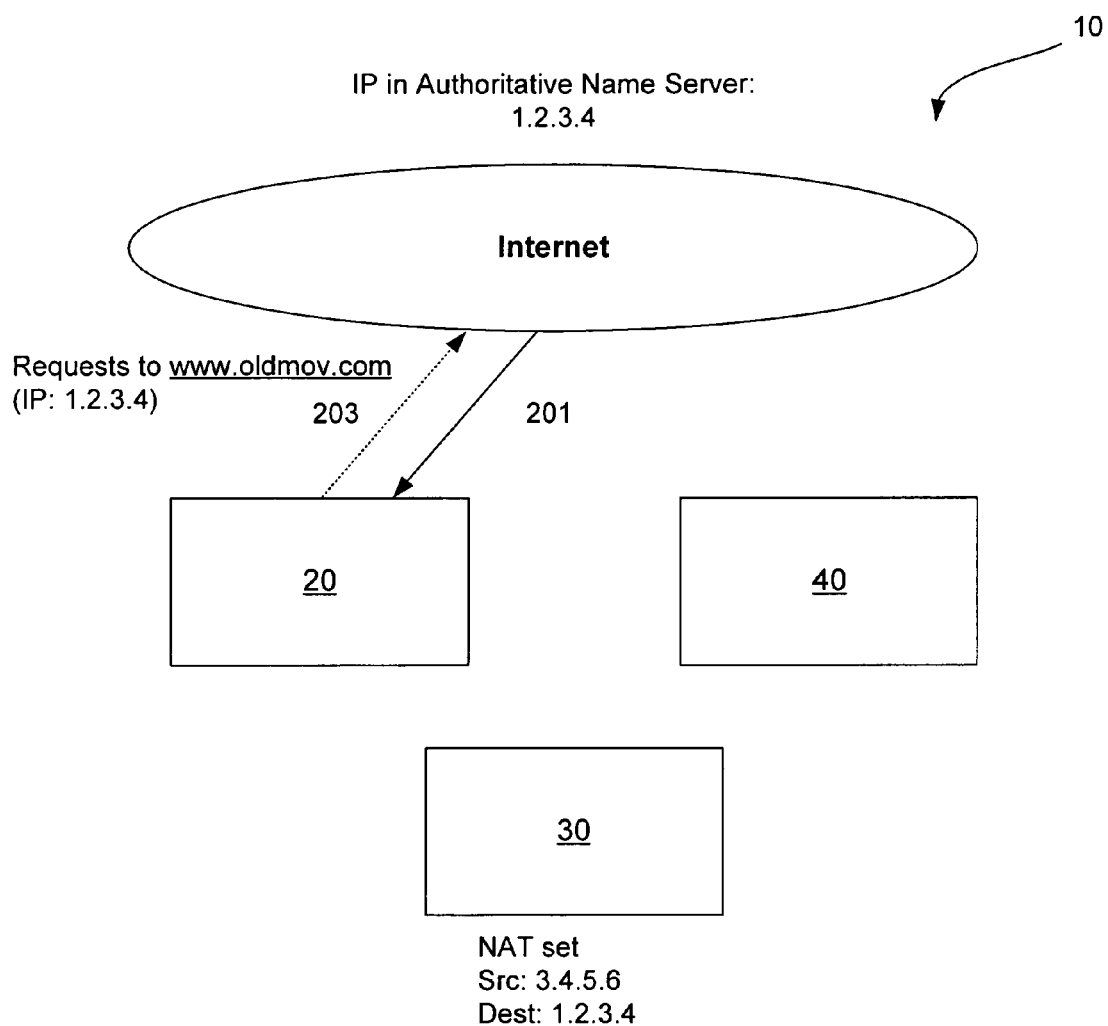
FIGS. 1-5 are block diagrams illustrating operation of a host migration system according to a first embodiment.

A server may be a data processing device that has storage and a processor performing multiple tasks. The server may be a personal computer, a workstation, or any type of a data processing device. The server may be connected to a communication network such as an internet, a local area network (LAN), a wide area network (WAN), etc. A plurality of clients also may be connected to the communication network. The clients may be data processing devices. Data is transferred between the server and the clients. The clients transmit a plurality of requests to the server and the server responds to the requests. The server may store the clients' information in its storage upon need.

FIGS. 1-5 are block diagrams illustrating a first embodiment of a host migration system. A hosting service is provided using a server that is run by a hosting service provider. The server is connected to an internet in this embodiment. In other embodiments, different communication networks such as LAN and WAN are possible. By way of example only, the hosting service hosts a website having the domain name of www.oldmov.com on the internet. The hosting system 10 includes a first server 20, a relay server 30 and a second server 40. Any type of server may be used for the first server 20, the relay server 30 and the second server 40 as long as it is suitable for web hosting services.

In this embodiment, the first server 20 has an IP address, 1.2.3.4. For convenience of explanation only, the first server 20 has a simplified form of the IP address. By way of example, the first server 20 hosts a website having a domain name, www.oldmov.com. The domain name, www.oldmov.com is mapped to the IP address, 1.2.3.4. An authoritative name server provides the IP address 1.2.3.4 stored in A record in response to a request for the domain name, www.oldmov.com. The first server 20 may host other websites that have the IP address, 1.2.3.4. A request from users for each website may be identified and directed to the relevant website at the first server 20, although the same IP address 1.2.3.4 is called in the request.

In FIG. 1, the first server 20 currently receives and responds to requests to the website, www.oldmov.com from users on the internet (data flows 201, 203). When users input the domain name, www.oldmov.com in their web browsers, a local name server finds and provides the corresponding IP address, 1.2.3.4 to the web browsers, which send the request to the first server 20. Port number such as 80 for HTTP is used with the IP address 1.2.3.4 but it may be omitted here for convenience of discussion. The relay server 30 and the second server 40 have different IP addresses from that of the first server 20. In this embodiment, the relay server 30 has the IP address, 3.4.5.6 and the second server 40 has the IP address, 5.6.7.8 by way of example. The IP addresses for the relay server 30 and the second server 40 also have simplified forms for convenience of explanation only. In FIG. 1, the relay server 30 and the second server 40 currently do not provide internet services.

The first and second servers 20 and 40 may be configured to be suitable as hosting servers that supply various internet services such as web, emails, FTP, etc. Alternatively, or additionally, the first and second servers may be configured to be dedicated to one type of internet service, e.g., a web server, an email server, etc. The relay server 30 does not need to be equipped with hosting environment.

In FIG. 1, Network Address Translation (NAT) configuration may be applied to the relay server 30. The NAT technique is a method of connecting multiple computers to the internet using one IP address. The NAT technique is used to resolve a shortage problem of IP addresses. One IP address is exposed to an external network such as the internet and multiple private IP addresses are used among internal computers. As a result of the NAT technique, internal network traffic may be presented to the external network as if it is coming from a single computer having one public IP address, despite multiple private IP addresses. The NAT technique may operate at an IP level among TCP/IP stacks. The NAT technique may change source and/or destination IP addresses of a data packet. In this embodiment, the NAT technique may be used to format a source address and/or a destination address of incoming and outgoing data packets at the relay server 30. For instance, a data packet from users is formatted to have the source address, 3.4.5.6 and have the destination address, 1.2.3.4, as a result of the NAT configuration.

Figure 2:
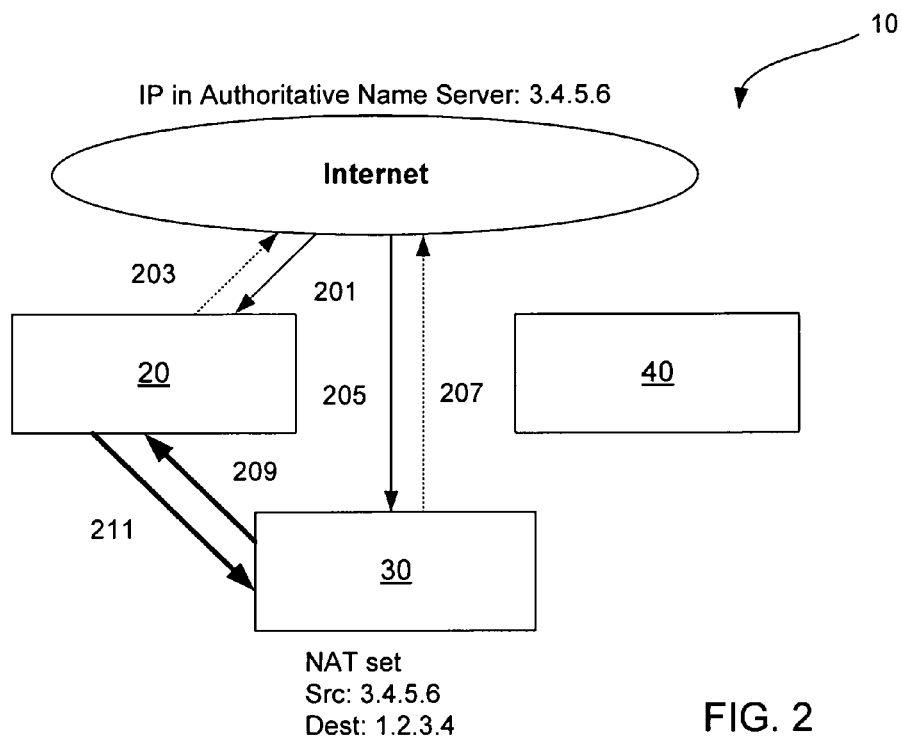

In FIG. 2, the host migration system 10 starts to perform the migration. The IP address for the domain name, www.oldmov.com may be changed to 3.4.5.6 from 1.2.3.4. Some name servers start providing the IP address 3.4.5.6 to web browsers of users upon their requests to www.oldmov.com. To this end, authoritative name servers may modify address records, which are used to store an IP address mapped to a certain domain name. The address records are cached at the name servers and/or browsers. Alternatively, if a preexisting authoritative name server registered with a registrar may not modify address records, a new authoritative name server replaces the preexisting authoritative name server and may modify address records. Various other modifications of address records are possible. Further, various types of DNS records may be used. After modification of address records, IP address 3.4.5.6 may be recognized upon requests to the domain name, www.oldmov.com based on some cached record.

As a result of the IP address change, some requests to www.oldmov.com may be directed to the relay server 30 having the IP address, 3.4.5.6 in FIG. 2 (data flow 205). Other requests still reach the first server (data flow 201). A data packet received at the relay server 30 may be redirected to the first server 20 (data flow 209). At the relay server 30, the data packet has been formatted to have the IP address, 3.4.5.6 as the source address instead of users' IP address. The IP address, 1.2.3.4 (data flow 209) becomes a destination address of the data packet. As a result, data packets from the requests received at the relay server 30 are redirected to the first server 20 (data flow 209), which in turn processes them. The first server 20 processes the data packets and sends response data packets to the relay server 30 based on the source address, 3.4.5.6 (data flow 211). The relay server 30 also may format the outgoing data packets to have 3.4.5.6 as the source address and users' IP address as the destination address. The relay server 30 may transmit the data packet to users (data flow 207). The first server 20 also responds to users who send the requests thereto (data flow 203).

The new IP address, 3.4.5.6 for the domain name, www.oldmov.com, may take several hours to several days for full propagation. Name servers as well as web browsers of users need to update the new IP address. It is difficult to control simultaneous updates of caches contained in the name servers and browsers. This indicates that some requests are still directed to the first server 20 having the IP address, 1.2.3.4. Although the request is received at the relay server 30, the first server 20 receives these requests from the relay server 30 and processes them (data flow 209, 211). At this point, the first server 20 may be the active point of data update. In FIG. 2, the second server 40 still may not provide any internet service.

Figure 3:
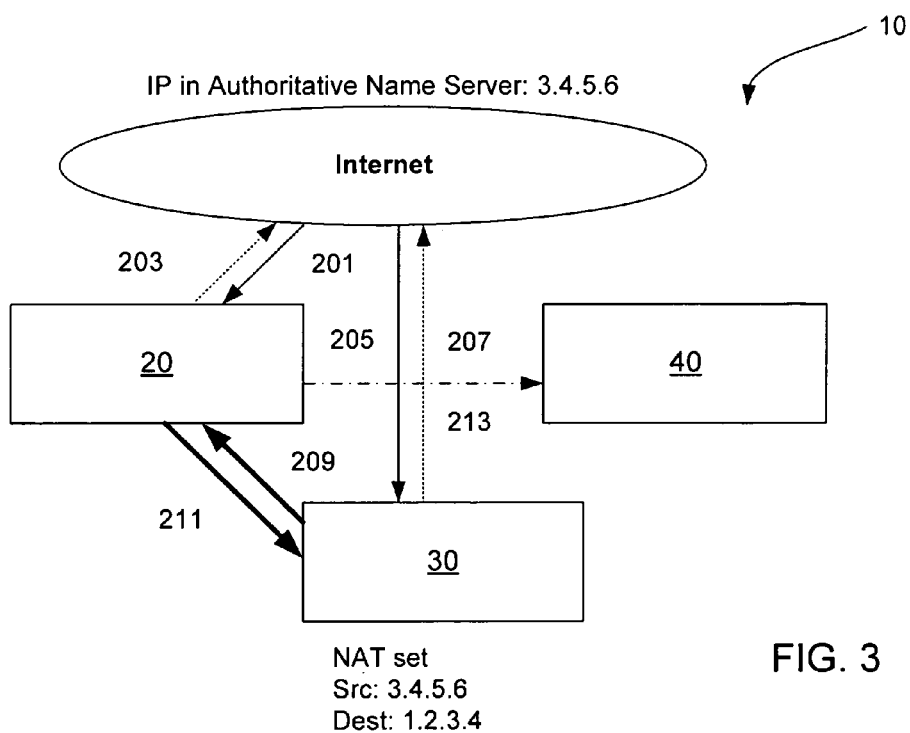

In FIG. 3, the IP address for the domain name, www.oldmov.com still remains 3.4.5.6. As the IP address 3.4.5.6 gradually propagates, the requests directed to the relay server 30 may outnumber the requests directed to the first server 20. Alternatively, or additionally, statistical information may be available to indicate how many requests are directed to the relay server 30 and the first server 20, respectively. As shown in FIG. 3, the content of the first server 20 may be copied to the second server 40 at an appropriate timing (213). Most of the content of the first server 20 may be copied this time. Prior to the copying operation (213), the second server 40 is subject to configuration settings.

The full propagation of the IP address may take several hours to several days. For a practical consideration, arbitrary cutoff time line for the IP address propagation may be applied to the host migration system 10. For instance, it is three days in this embodiment. It is appreciated to one of skill in the art that the propagation time is not limited to three days and it may be several hours, one day, a week, etc. Even if the propagation may take shorter than three days, it is hardly predictable when DNS caches have been updated. After three days, it is expected that the new IP address, 3.4.5.6 may be fully propagated and cached at browsers and that multiple name servers may replace the new IP address for the old IP address, 1.2.3.4 for www.oldmov.com. Based on the number of requests and/or the statistical information, more accurate propagation time may be determined.

Figure 4:
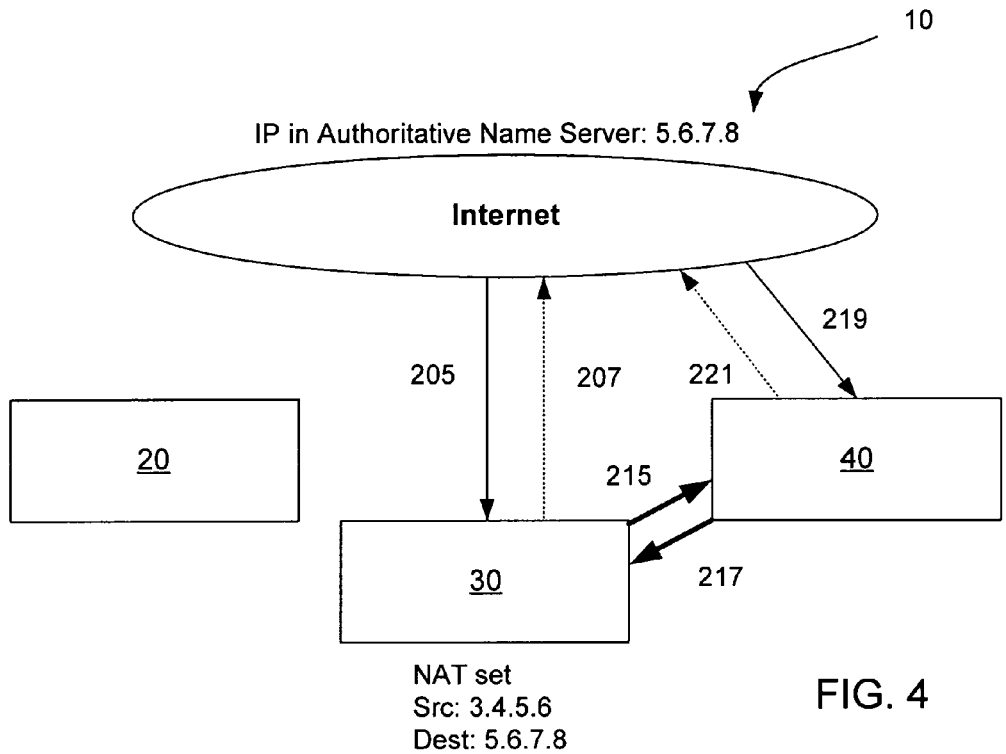

In FIG. 4, the hosting service at the first server 20 may be terminated. The termination of the hosting service at the first server 20 may be determined at least based on the information that almost no request is directed to the first server 20. Immediately subsequent to the termination of the hosting service, any change and/or update to the content and database of the first server 20 may be copied to the second server 30. The content copy may be made with a file transfer tool such as rsync, which is open source utility software that provides fast incremental file transfer. This final synchronization may not take long. As noted above in conjunction with FIG. 3, most of the contents are already copied to the second server 40 (data flow 213).

As shown in FIG. 4, the IP address corresponding to the domain name, www.oldmov.com is changed again. The IP address for the domain name, www.oldmov.com is changed to the IP address of the second server 40, 5.6.7.8. Accordingly, the NAT setting of the relay server 30 is also changed. During another propagation period, e.g. about 3 days, requests are directed to the relay server 30 (data flow 205) and the second server 40 (data flow 219). As the new IP address, 5.6.7.8 may propagate, more requests may be directed to the second server 40 than the relay server 30 (data flows 205, 219).

The data packet is formatted to have the source address 3.4.5.6 and the destination address 5.6.7.8 at the relay server 30. The data packet of the requests received at the relay server 30 (data flow 205) may be redirected to the second server 40 (data flow 215). The second server 40 receives requests and processes them. At this time, the second server 40 may become an active point of data update. The second server 40 sends a response data packet to the relay server 30. The relay server 30 transmits the data packet back to users (data flow 207).

Figure 5:
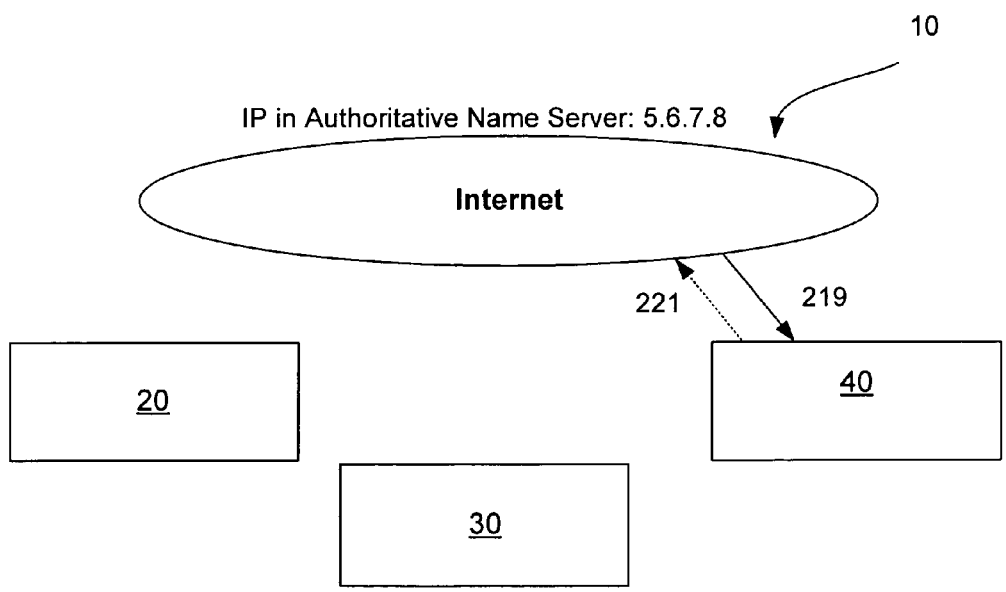

In FIG. 5, by the end of the third day, for example, most of the requests may be directed to the second server 40 (data flow 219). The relay server 30 along with the first server 20 terminates operations.

As described above, the host migration system 10 is able to perform migration from the first server 20 to the second server 40 with substantially minimized downtime. During the IP address propagation, data from users' request may be continuously updated to the first server 20 and the second server 40 via the relay server 30, regardless of whether users send requests to the first server 20, the relay server 30 and the second server 40. Although the IP address propagation take several days, data inconsistency and data corruption may be substantially reduced. Intensive labor and sophisticated technique may not be needed.

Hosting service providers may have no complete control to change the IP address of the first server 20 and the second server 40. This complete control is referred to as root permission in UNIX® system. Hosting services providers have a complete control to the relay server 30. Accordingly, the relay server 30 may be almost always used to provide the NAT configuration change. The relay server 30 is not limited to the first and second servers 20 and 40 and the host migration system 10. The relay server 30 may be used with any host migration system upon migration.

The first embodiment shown in FIGS. 1-5 shows change of the IP address only. Port numbers are not shown for convenience because no changes to port numbers may occur during migration. The NAT configuration generally involves configuration of IP address and port number. A data packet includes a header that contains source and destination addresses and port numbers. Port numbers may be designated for certain services. For example, a port number for Simple Mail Transfer Protocol (SMTP) may be 25, and port numbers for Hyper Text Transfer Protocol (HTTP) services may be 80, respectively. In one embodiment, the first server 20 may supply web hosting services and SMTP services and the second server 40 also may supply the same services. In other embodiments, the first server 20 may supply various services but the second server 40 may not support the same services provided by the first server 20. FIGS. 6-9 are block diagrams illustrating a host migration system in which a data packet is redirected to two servers having different IP addresses depending on port numbers.

Figure 6:
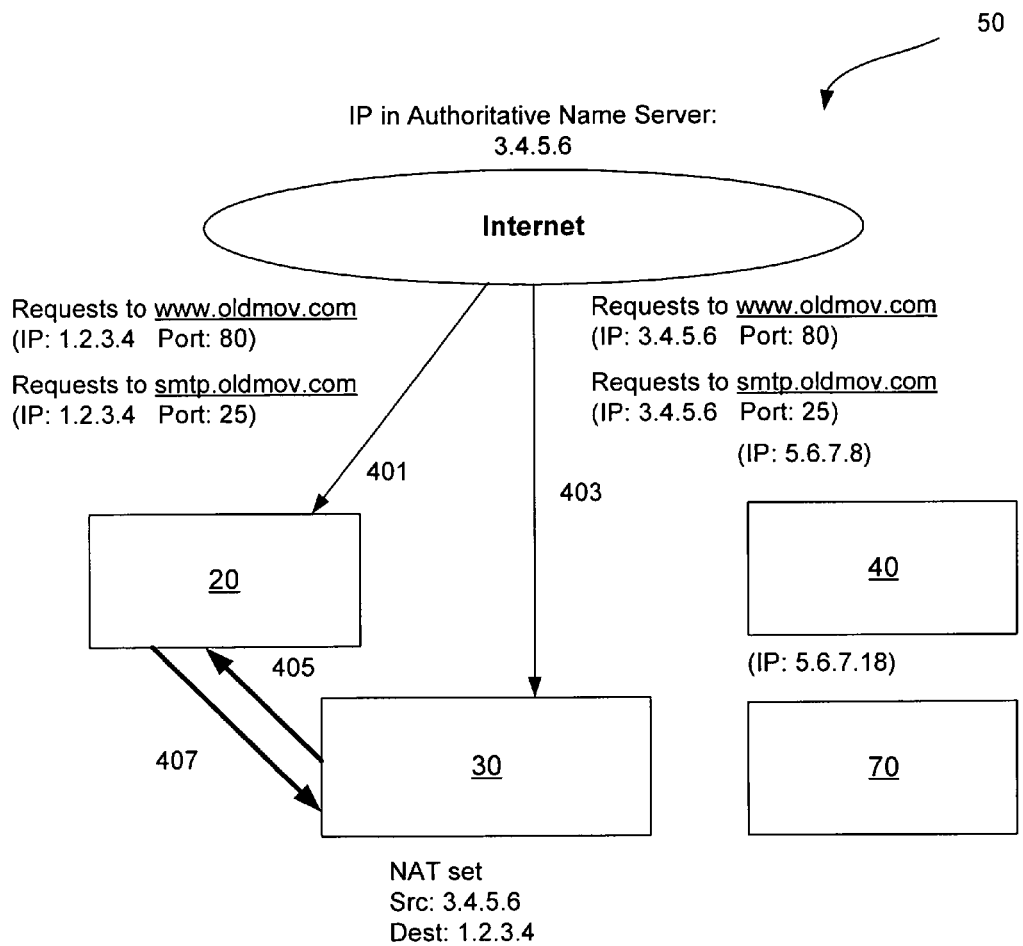
FIG. 6-9 are block diagrams illustrating operation of a host migration system according to a second embodiment.

FIGS. 6-9 illustrate a second embodiment of a host migration system. A host migration system 50 may include the first server 20 and the relay server 30 described in conjunction with FIGS. 1-5. The host migration system 50 also may include the second server 40 and a third server 70. The initial IP address corresponding to the domain, www.oldmov.com and smtp.oldmov.com is 1.2.3.4 and requests are directed to the first server 20 as shown in FIG. 1 (data flow 401). Responses to the requests from users are described in conjunction with FIGS. 1-5 (data flows 203 and 207) and omitted here. Subsequently, the IP address for both domain names, www.oldmov.com and smtp.oldmov.com is changed to the IP address 3.4.5.6 of the relay server 30. The relay server 30 may be subject to NAT configuration so that a data packet is formatted to have source address 3.4.5.6 and destination address 1.2.3.4. As a result, the data packet received at the relay server 30 is redirected to the first server having the IP address 1.2.3.4 (data flow 405). As shown in FIG. 6, some requests are directed to the first server 20 and other requests are to the relay server 30. During the transition of the IP address, the data packet may be transferred between the relay server 30 and the first server 20. The third and fourth servers 40 and 70 are not in operation yet.

By way of example only, the first server 20 host both web hosting services, www.oldmov.com and email services, smtp.oldmov.com. The IP address of the first server 20 may be 1.2.3.4 and requests from users are directed to the first server 20 (data flow 401). The requests may be related to SMTP services (1.2.3.4/25) or web services (1.2.3.4/80). The first server 20 serves both requests. Requests are also directed to the relay server 30 (data flow 403) in the same way.

Figure 7:
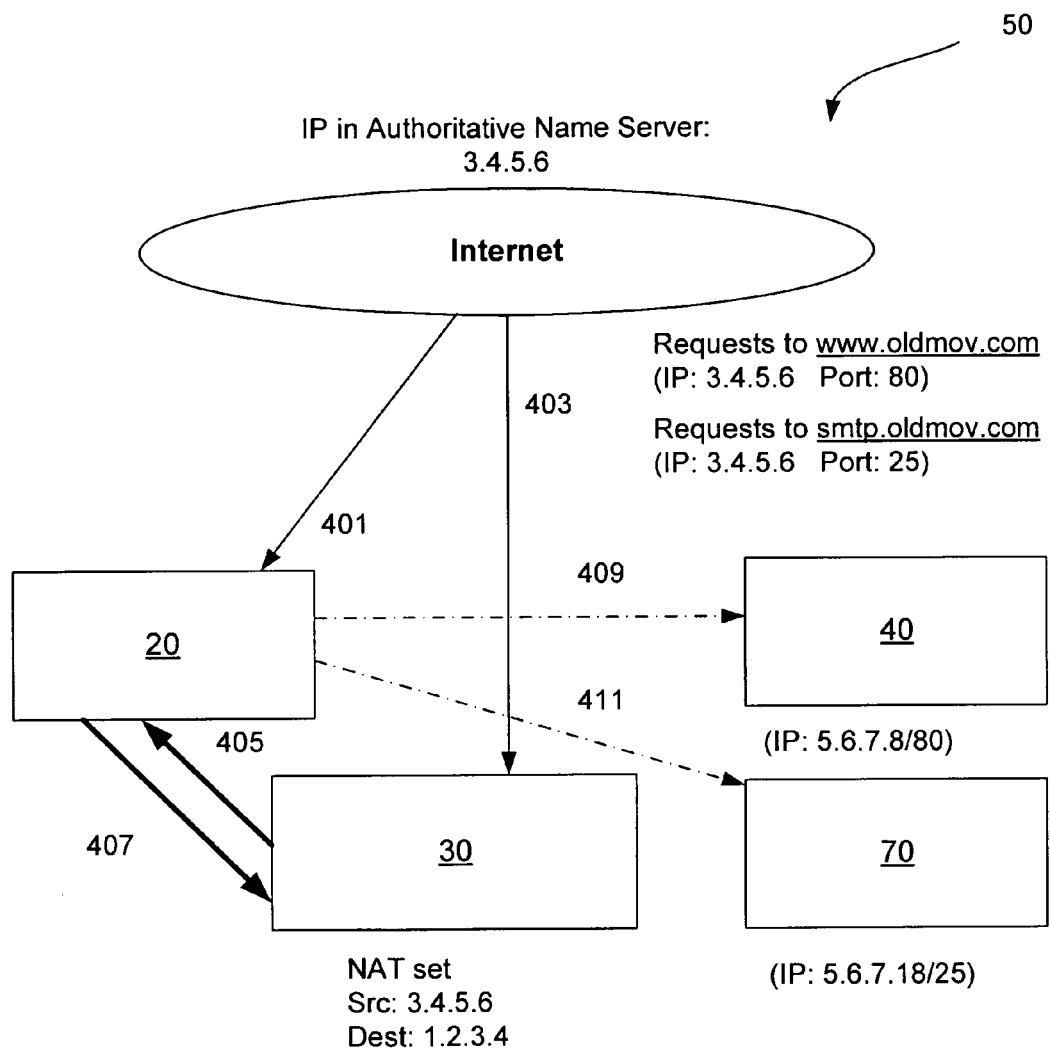

In FIG. 7, the content of the first server 20 may be copied to the second server 40 and the third server 70 (data flows 409, 411). For example, web hosting services may be provided at the second server 40 and SMTP services may be provided at the third server 70. The second server 40 may have the IP address, 5.6.7.8 and the third server may have the IP address, 5.6.7.18.

Figure 8:
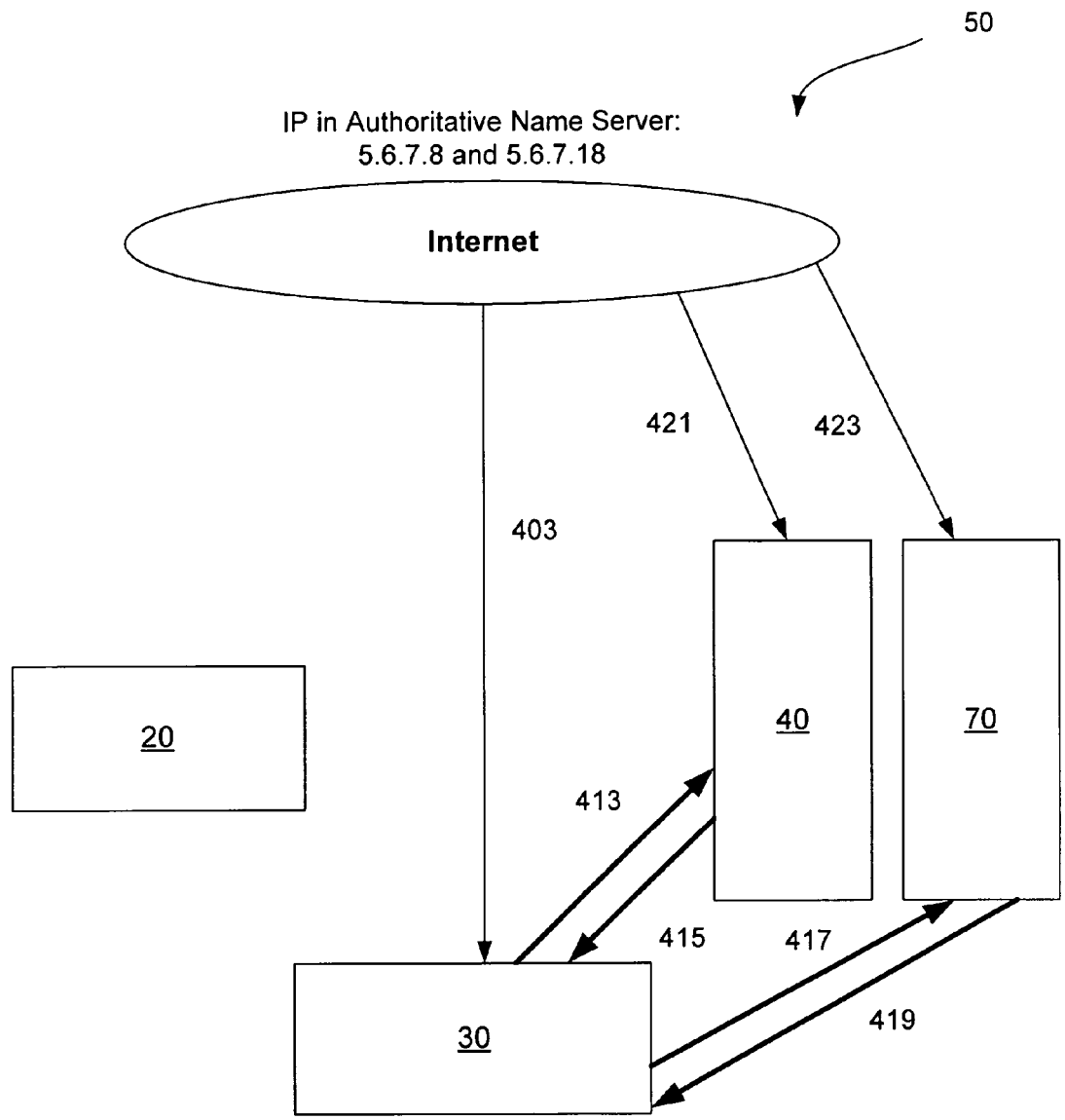

In FIG. 8, the IP address corresponding to domain names, www.oldmov.com and smtp.oldmov.com may be changed again. The IP address may be changed to 5.6.7.8 and 5.6.7.18. Requests from users may be directed to the relay server 30, the second server 40 and the third server 70 (data flows 403, 421, 423). Requests directed to the relay server 40 may have the IP address, 3.4.5.6 and port numbers may be different depending on whether requests are directed to web services and SMTP services. Port numbers for web services and SMTP services are 80 and 25, respectively. Requests having "IP address/port number" formats, such as 3.4.5.6/80 and 3.4.5.6/25, may be directed to the relay server 30. Requests having 5.6.7.8/80 may be directed to the second server 40 and requests having 5.6.7.18/25 may be directed to the third server 70.

Prior to the change of the IP address, the relay server 30 may be subject to the NAT configuration. The data packets having the destination address, 3.4.5.6/80 and the destination address, 3.4.5.6/25 may be received at the relay server 30. The relay server 30 may be configured so that the data packet is formatted to have the source address, 3.4.5.6 and have the destination address, 5.6.7.8/80. This data packet may be redirected to the second server 40 (data flow 413). Further, the data packet is formatted to have the source address, 3.4.5.6 and have the destination address, 5.6.7.18/25. This data packet may be redirected to the third server 70 (data flow 417). As a result, the data packet relating to web services is redirected to the second server 40 (data flow 413) and the data packet relating to SMTP services is redirected to the third server 70 (data flow 417). Based on the source addresses, the second server 40 and the third server 70 send response data packets back to the relay server 30 (data flows 415, 419).

Although not shown in FIGS. 6-9 and described mainly with regard to configuration for redirection, the full NAT configuration at the relay server 30 may be performed as follows. The client sends a web request to the relay server 30. At the relay server, a data packet of the web request has x.x.x.x/yy1 as a source address and 3.4.5.6/80 as a destination address. At the relay server 30, the data packet is formatted with the NAT technique that the source address becomes 3.4.5.6/yy2 and the destination address 5.6.7.8/80. As a result, the packet is redirected to the second server 40. At the second server 40, the data packet is processed and a resulting response data packet is returned to the relay server 30. The response data packet has the source address 5.6.7.8/80 and the destination address 3.4.5.6/yy2. Based on the destination address 3.4.5.6/yy2, the second server 40 determines the source of this data packet, i.e., the relay server 30. The data packet returns to the relay server 30 and at the relay server 30, the data packet is formatted to have 3.4.5.6/80 as the source address and x.x.x.x/yy1 as the destination address. Eventually, the data packet is sent back to the client based on the destination address.

PACKET FROM CLIENT: source: x.x.x.x./yy1 destination: 3.4.5.6/80

RELAY SERVER: source: 3.4.5.6/yy2 destination: 5.6.7.8/80

SECOND SERVER: source: 5.6.7.8/80 destination: 3.4.5.6/yy2

RELAY SERVER: source: 3.4.5.6/80 destination: x.x.x.x/yy1

Here, the IP address, x.x.x.x and the port numbers yy1 and yy2 represent arbitrary IP address and port numbers.

Figure 9:
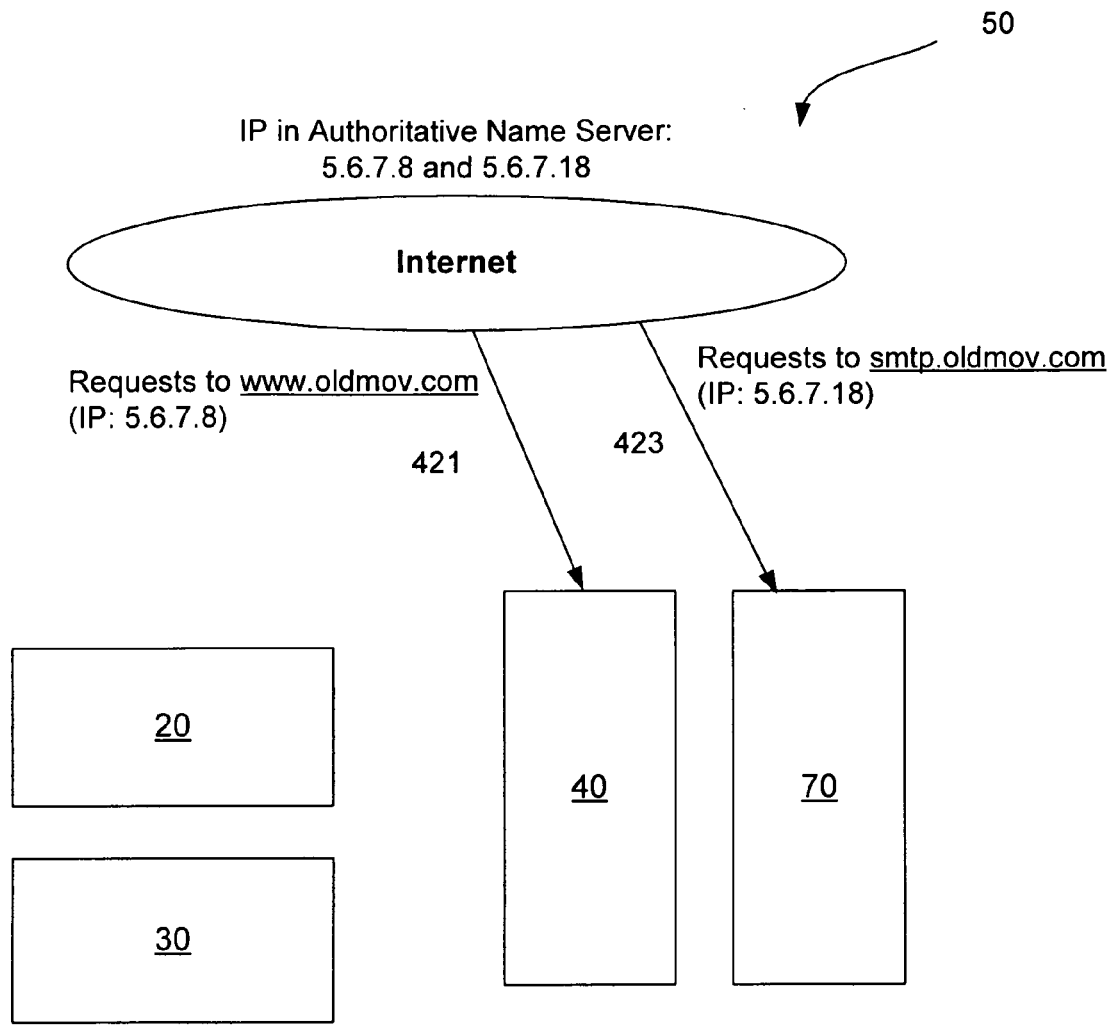

As the IP addresses, 5.6.7.8 and 5.6.7.18 propagate, requests directed to the second server 40 and the third server 70 may outnumber requests directed to the relay server 30. The number of requests directed to the relay server 30 may be tracked and evaluated. When the number of such requests is close to substantially zero, the relay server 30 is no longer in service as shown in FIG. 9. As a result, the web requests are directed to the second server 40 and the SMTP requests are directed to the third server 70.

In the second embodiment, the content of the first server 20 may be migrated to the second and third servers 40 and 70 having different IP addresses. As a result, different services hosted by a single server may be migrated to separate servers. The host migration system 50 is able to perform migration of web services to the second server 40 and migration of emails services to the third server 70, respectively. Efficient migration with reduced downtime is possible.

Alternatively, the first server 20 and another source server may host the web service and the SMTP service, respectively, and the second server 40 operates to provide both the web service and the SMTP service. Host migration may be performed in a substantially similar manner to the second embodiment as shown in FIGS. 6-9. Instead of the third server 70, the another source server is hosting the SMTP service. The relay server 30 receives the requests as the IP addresses are changed to the IP address of the relay server 30 and redirects the requests to the first server 20 and the another source server depending on the web request or the SMTP request. The contents of the first server 20 and the another source server are copied to the second server 40. As the IP address of the domain name is further changed to the IP address of the second server 40, the relay server 30 redirects the data packet to the second server 40.

In the first and second embodiments, the relay server 30 is used to change the IP address mapped to the domain name, www.oldmov.com and smtp.oldmov.com. Users may change hosting service providers for various reasons such as low price, more services, etc. A new hosting service provider may supply a hosting service that has been hosted by a competing hosting service provider. The new hosting service provider may not have any complete control to the hosting server, so that the packets' IP address of the server hosting internet services may not be changed. Instead, the relay server 30 may be used to change the IP address of the data packets. In other embodiments, the new hosting service provider may have the complete control to the server hosting the website. For instance, the current hosting service provider may provide the complete control per users' request.

Figure 10:
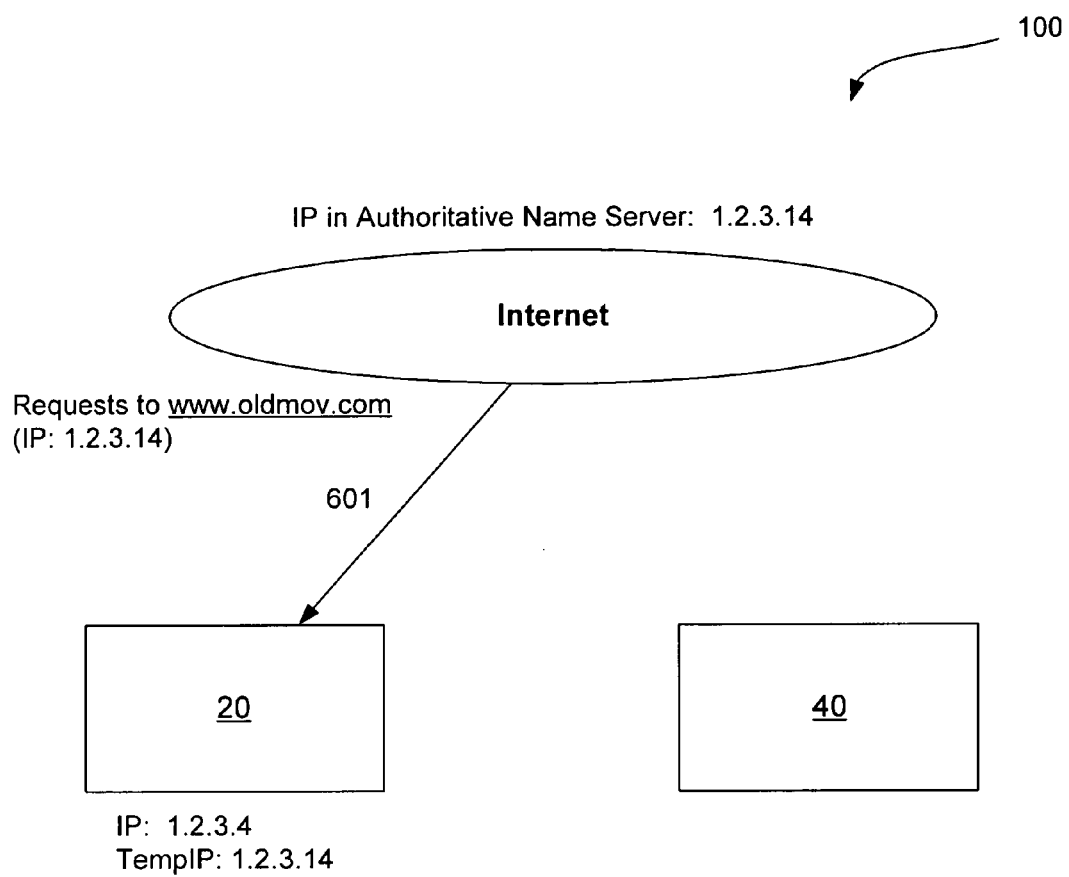
FIG. 10-13 are block diagrams illustrating operation of a host migration system according to a third embodiment.

FIGS. 10-13 are block diagrams illustrating a third embodiment of a host migration system. In the third embodiment, a new hosting service provider may have the complete control to a server hosting a website. In FIG. 10, a host migration system 100 includes the first server 20 and the second server 40. No relay server such as the relay server 30 may be used. The first server 20 has the IP address, 1.2.3.4 and the second server 40 has 5.6.7.8. In this embodiment, the first server 20 hosts many websites including the website, www.oldmov.com (data flow 601). In particular, the first server 20 is shared by many websites and only the website, www.oldmov.com is migrated to the second server 40. In other embodiment, the first server 20 may be a dedicated one, which may host only the website, www.oldmov.com. This embodiment will be described below.

Figure 11:
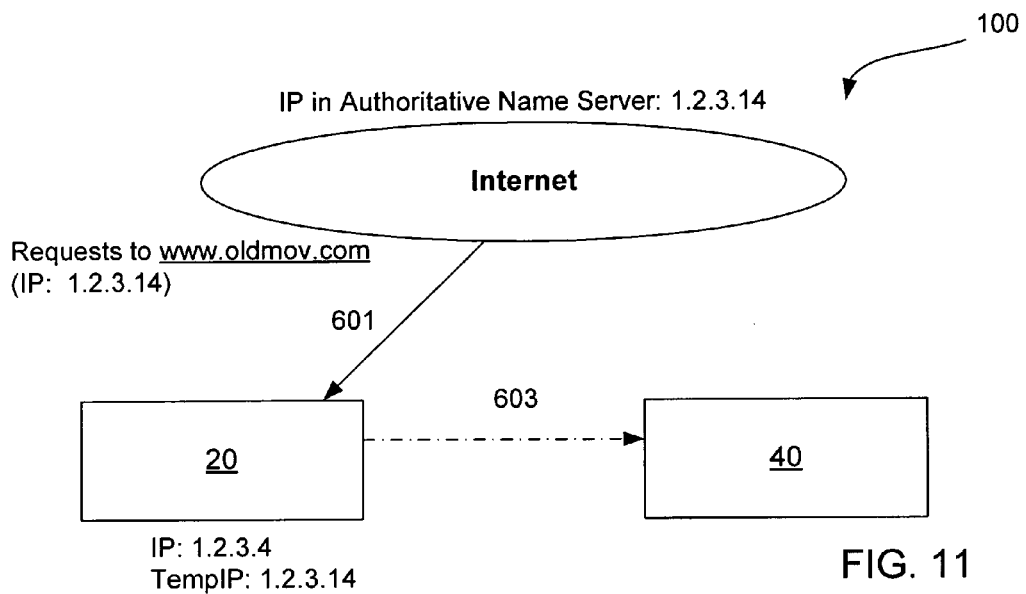

In FIG. 11, the IP address corresponding to the domain name, www.oldmov.com may be changed to a temporary IP address, e.g., 1.2.3.14. The first server 20 maintains the IP address, 1.2.3.4 for other websites that are hosted by the first server 20. Only the IP address corresponding to www.oldmov.com is changed. In this embodiment, hosting service providers may have the complete control to change the IP address at the first server 20. As the IP address, 1.2.3.14 gradually propagates, the requests directed to www.oldmov.com for the IP addresses 1.2.3.4 and 1.2.3.14 are both received at the first server 20 (data flow 601). During the propagation time, the first server 20 receives the requests and processes them.

While the IP address is propagating, the content of the first server 20 for the website, www.oldmov.com may be copied to the second server 40 (data flow 603), as shown in FIG. 11. The second server 40 is not in service. The second server 40 may be regularly updated with the copying process. At this time, the first server 20 is still the active point of receiving and processing requests from users and updating resulting data.

After a predetermined propagation time, most of requests may be directed to the temporary IP address 1.2.3.14 rather than the IP address, 1.2.3.4. The first server 20 is configured with NAT so that a data packet may be redirected to a server having the destination address, 5.6.7.8 (data flow 605). This NAT configuration may be performed immediately prior to change of the IP address from 1.2.3.14 to 5.6.7.8.

Figure 12:
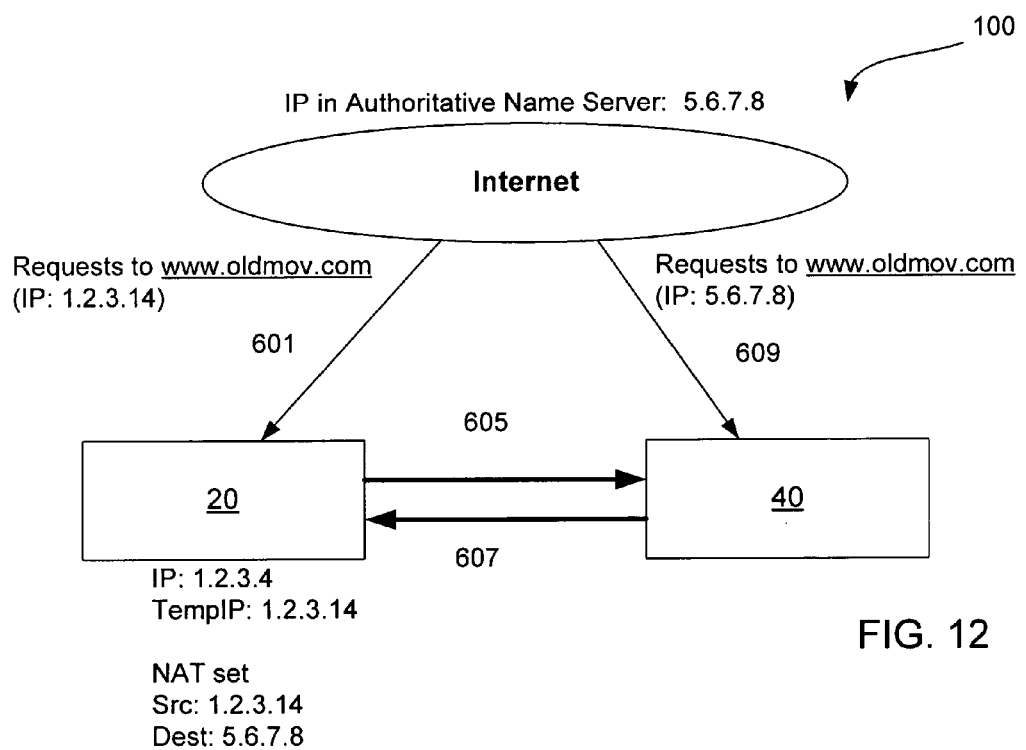

In FIG. 12, the IP address of the website, www.oldmov.com is changed to the new IP address 5.6.7.8 from the temporary IP address, 1.2.3.14. As the new IP address, 5.6.7.8 propagates, more requests may be directed to the second server 40 (data flow 609) than the first server (data flow 601). The first server 20 also receives some of requests directed to 1.2.3.14 during this transition period (data flow 601). The first server 20 formats a data packet to have the destination address as the IP address of the second server 40. As a result, the data packet is redirected to the second server 40 (data flow 605), and the second server 40 processes the data packet and sends a response data packet back to the first server based on the source address (data flow 607). Now, the second server 40 becomes the active point of data update.

Figure 13:
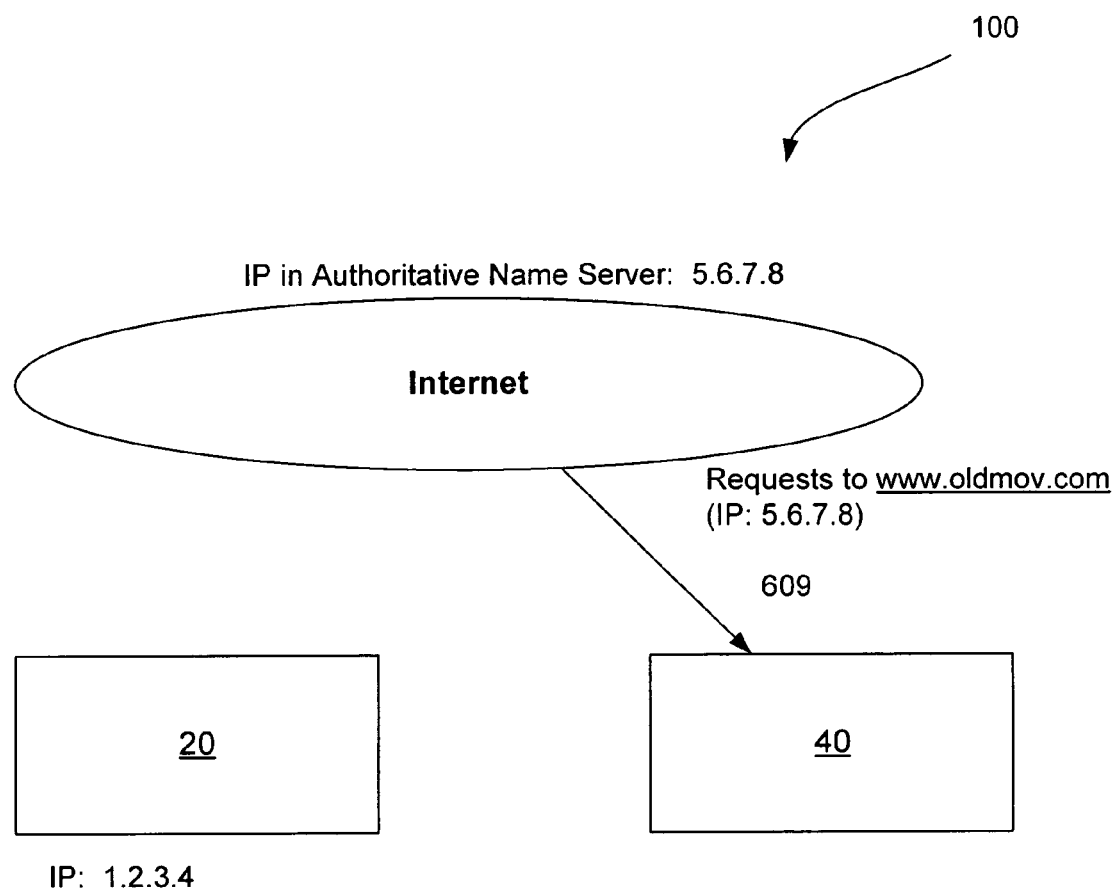

In FIG. 13, the first server 20 may remove the NAT configuration and the temporary IP address 1.2.3.14 is also removed. The requests are directed to the second server 40 (data flow 609), and the host migration is completed. Other websites sharing the first server 20 may not affected by this migration. Effective migration is possible without a relay server.

Unlike the third embodiment, the first server 20 may not be shared by many websites. Rather, the first server 20 is dedicated to a single website, for example, www.oldmov.com. No temporary IP address is needed in this case. The content and data of the first server 20 is copied to the second server 40. Then, the IP address of the second server 40 becomes the new IP address for the domain, www.oldmov.com and the same process described in conjunction with FIGS. 12-13 is performed.

In the third embodiment, hosting service providers have complete control at the first server 20, which is a source server. In a fourth embodiment, hosting service providers may have complete control at the second server 40, which is a destination server. As noted above, hosting service providers apply NAT configuration to the second server 40.

Figure 14:
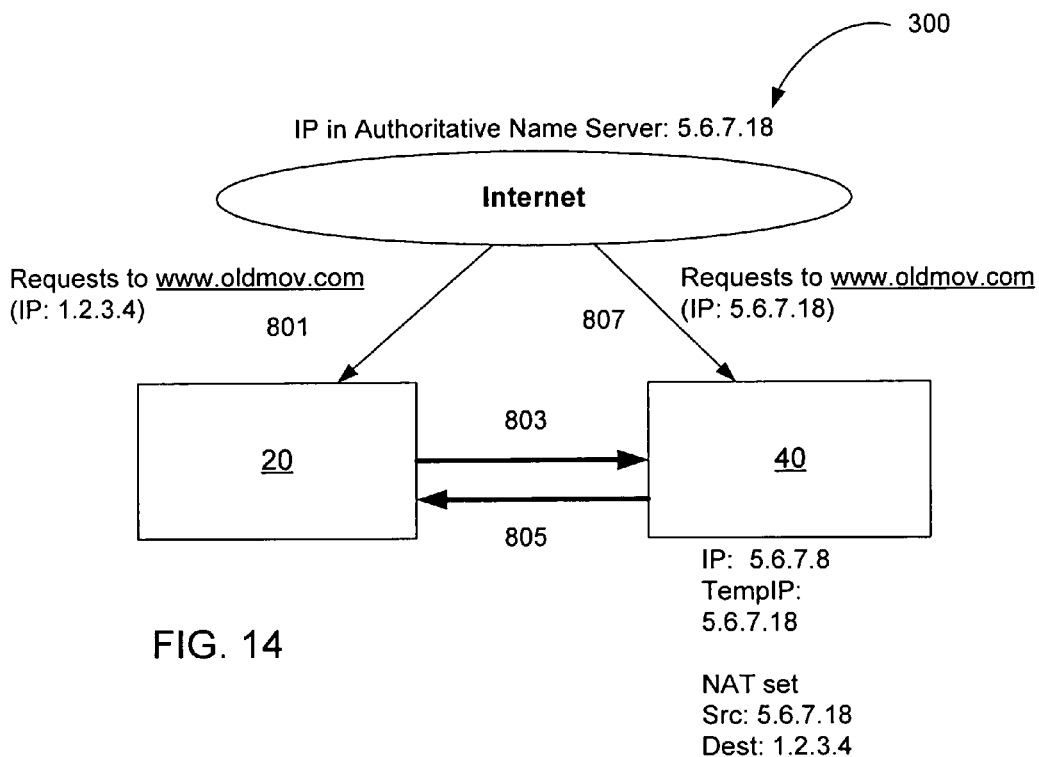
FIGS. 14-17 are block diagrams illustrating operation of a host migration system according to a fourth embodiment.

FIGS. 14-17 are block diagrams illustrating the fourth embodiment of a host migration system. In FIG. 14, a host migration system 300 includes the first server 20 and the second server 40. The first server 20 hosts the website, www.oldmov.com on the internet. In the host migration system 300, the second server 40 has a shared IP address. In other embodiment, the second server 40 is a dedicated server. With the complete control, a temporary IP address, 5.6.7.18 is set at the second server 40. The IP address for www.oldmov.com is changed from the IP address 1.2.3.4 of the first server 20 to the temporary IP address 5.6.7.18. Requests are received at the first server having the IP address, 1.2.3.4 and the second server having the IP address, 5.6.7.18 (data flows 801, 807) as the new IP address propagates. The NAT configuration may be applied so that the second server 40 redirects a received data packet to the first server 20 by formatting the data packet to have a destination address as the IP address 1.2.3.4 of the first server 20 (data flow 805). The first server 20 processes the data packet and sends it back to the second server 40 based on the source address (data flow 803).

Figure 15:
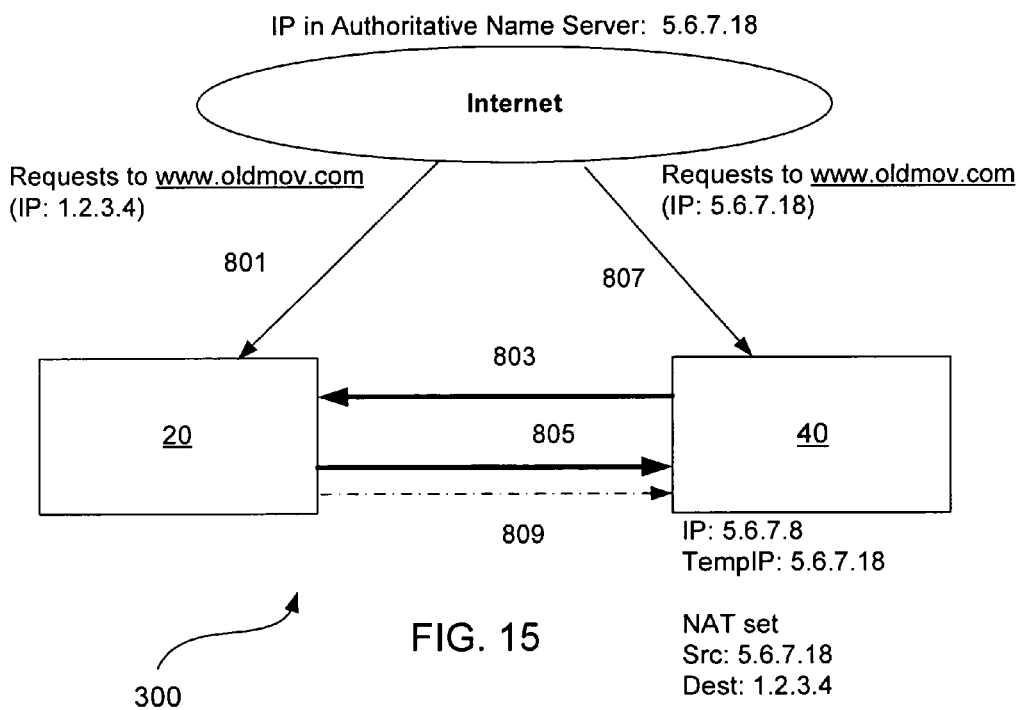
Figure 16:
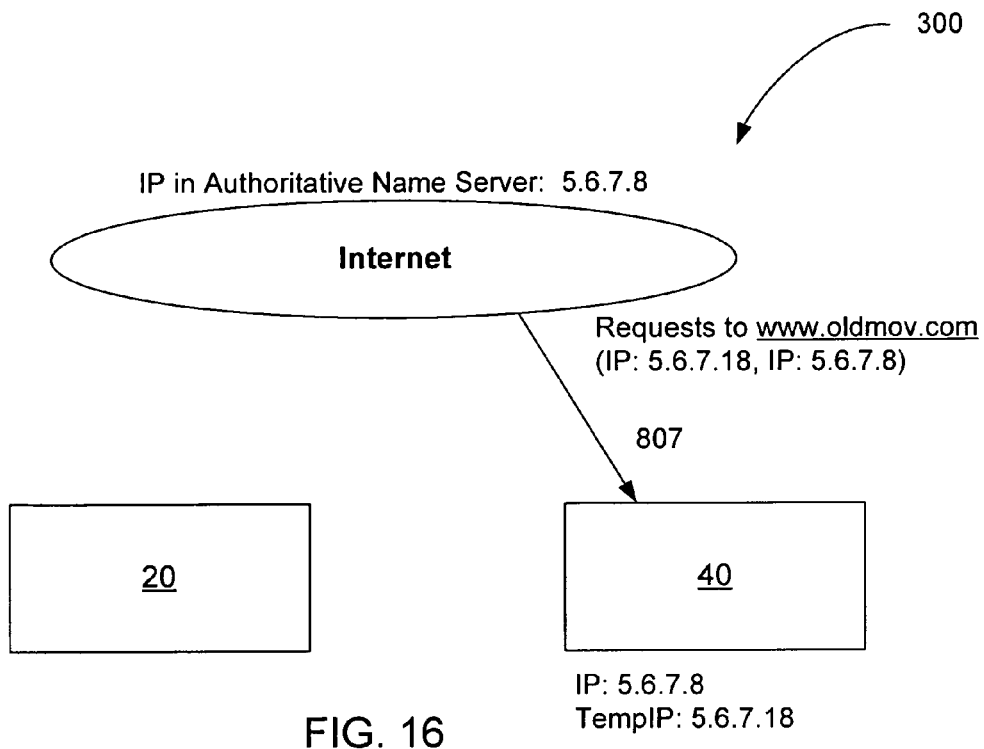

In FIG. 15, while the temporary IP address, 5.6.7.18 is propagating, the content of the first server 20 is copied to the second server 40 (data flow 809). The first server 20 operates as the active point of data update, although more requests are gradually directed to the second server 40 (data flow 807). When the temporary IP address fully propagates, the first server 20 experiences almost zero direct traffic. As shown in FIG. 16, the first server 20 is no longer in service and the NAT setting at the second server 40 is released. The second server 40 becomes the active point of data update.

In FIG. 16, the IP address for www.oldmov.com is again changed to the permanent IP address of the second server 40, 5.6.7.8. While this new IP address 5.6.7.8 is propagating, some of requests are directed to the IP address, 5.6.7.18 (data flow 807). Other requests are directed to the IP address 5.6.7.8 (data flow 809). As the propagation progresses, more requests are directed to the IP address 5.6.7.8 rather than the temporary IP address, 5.6.7.18. After a certain time period, most of requests for www.oldmov.com may be directed to the IP address, 5.6.7.8. At this time, the temporary IP address, 5.6.7.18 may be removed. The host migration is completed.

Figure 17:
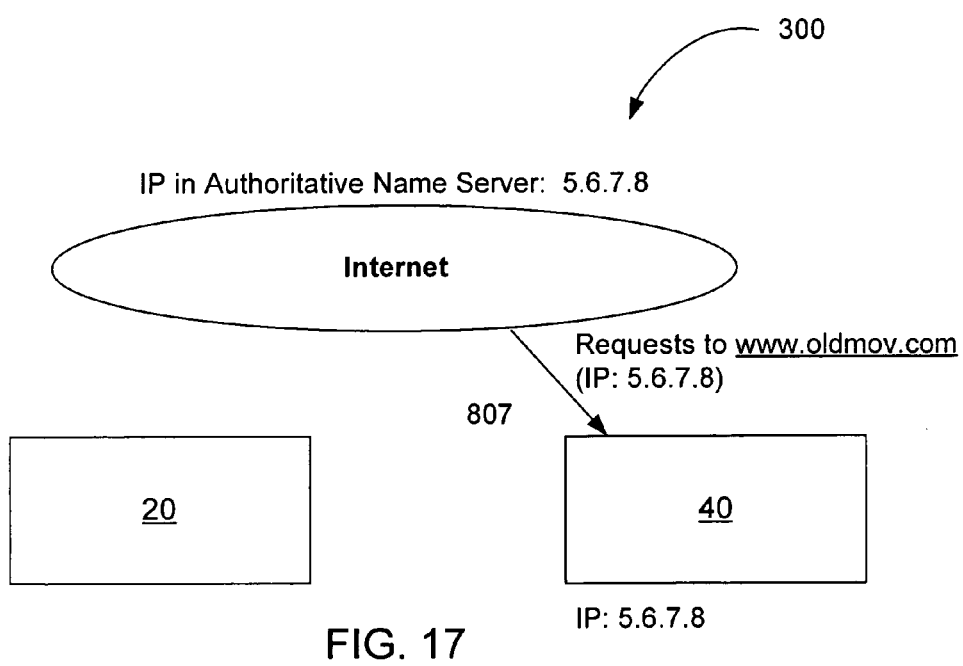

Unlike the fourth embodiment, the second server 40 may be a dedicated server. The dedicated IP address is directly used and the temporary IP address such as 5.6.7.18 is not needed. After the change of the IP address for www.oldmov.com to the IP address of the second server 40, the same process described in conjunction with FIGS. 16-17 is performed. Regardless of whether the second server 40 has a shared IP address or a dedicated IP address, downtime during the migration may be substantially minimized with the host migration system 300.

In the first to fourth embodiments, the first server 20 and the second server 40 do not change their IP addresses. In another embodiment, the IP address of the first server 20 and the second server 40 may not be preserved. For example, the first server 20 is physically moved into another location with a different subnetwork. In this case, the IP address of the first server 20 is changed. Alternatively, the first server 20 may be assigned with a dynamic IP address under Dynamic Host Configuration Protocol (DHCP). When the first server is connected to the internet, it is assigned with any available address at the time of connection. For instance, this situation may occur when a home computer is used as a host server and a commercial internet service provider supplies an internet access to the home computer using a DHCP server.

Figure 18:
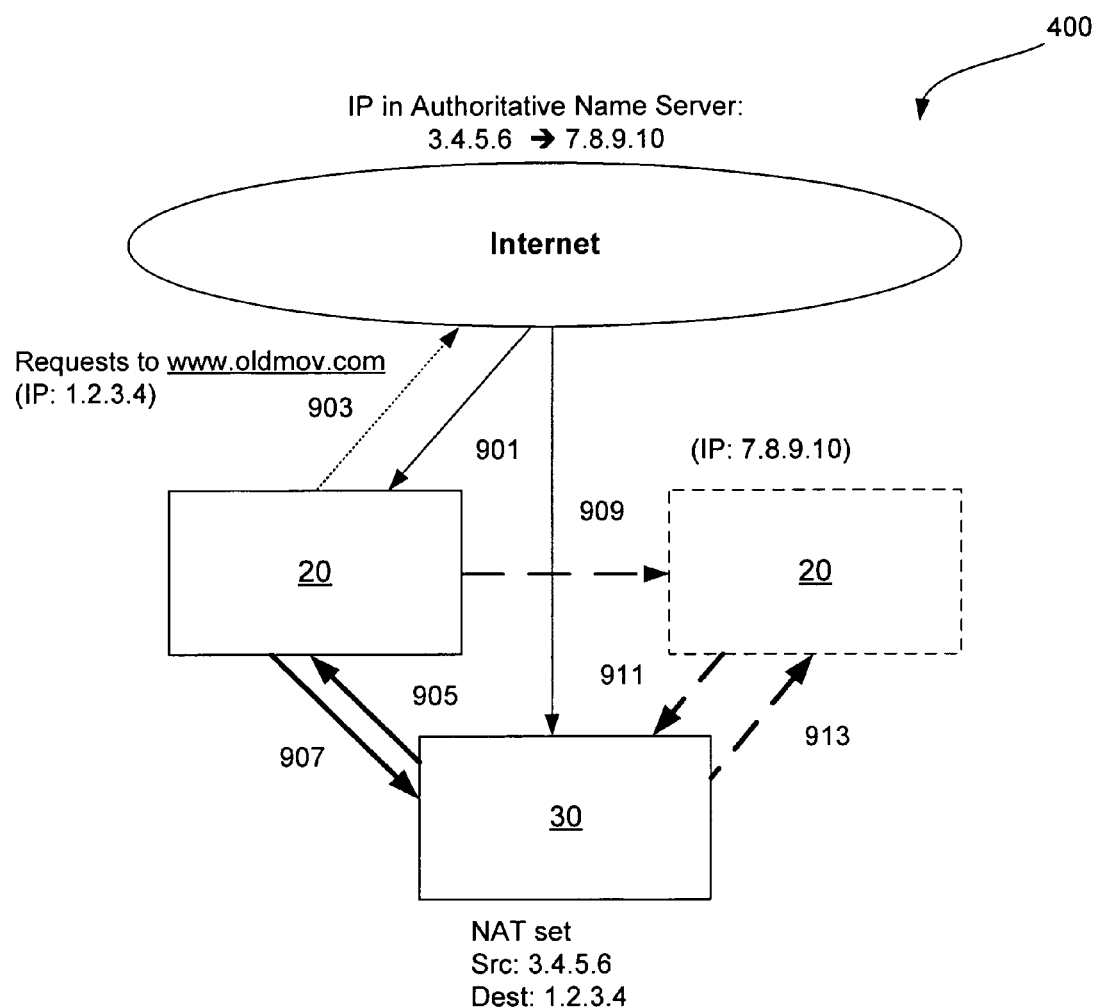
FIG. 18 is a block diagram illustrating operation of a host migration system according to a fifth embodiment.

In FIG. 18, a fifth embodiment of a host migration system 400 is shown. In a host migration system 400, while the first server 20 is physically moved, the relay server 30 is used. Prior to moving, the host migration system 400 starts operating in light of a propagation period, such as three days. Namely, the host migration system 400 changes the IP address 1.2.3.4 of the domain name, www.oldmov.com to the IP address 3.4.5.6 of the relay server 30 at least three days ago. When the propagation has been completed, a greater amount of requests may be directed to the relay server 30. The first server 20 may have zero direct traffic. Subsequently, the first server 20 may be disabled for moving. The first server is moved to a different location. The IP address may be changed and assigned to a new IP address such as 7.8.9.10 of the first server 20. The relay server 30 is configured with NAT so that a data packet is redirected to the first server 20 during the migration (data flow 905). The first server 20 is used in place of the second server 40 after it is moved into another location and has the new IP address such as 7.8.9.10. The IP address of the domain name is changed to the new IP address 7.8.9.10. As the new IP address 7.8.9.10 propagates, the relay server 30 redirects the data packet to the first serer 20 having the new IP address (data flow 913). Without downtime, moving the server from one location to another is possible.

When the IP address is a dynamic address, the dynamic address may be generated upon connection of the server with a DHCP server. For hosting, users may keep their computer connected to the internet and the IP address is not frequently changed. When users need to turn off their computer for software upgrade, hardware problems, etc., it is predictable that new dynamic IP addresses such as 7.8.9.10 will be assigned upon connection. The relay server 30 is used to relay the data packet to the first server 20 having the original IP address (data flows 905, 907) and the changed dynamic IP address (data flows 911, 913).

Copying of the content of the first server 20 is not needed when the first server 20 is physically moved, or the dynamic IP address is generated. The first server 20 is not changed nor is the content of the first server 20 changed.

In the host migration system, the hosting service may be migrated from the first server to the second server with substantially reduced downtime. The hosting service providers may or may not have the complete control to apply NAT configuration to the first server and the second server. Without the complete control, the host migration system employs the relay server. The relay server is linked to the first server and the second server in sequence and maintains the connection among servers during the migration period. When the first server or the second server is disabled, the downtime may be prevented through the relay server.

With the complete control, no relay server may be needed. The first server and the second server are subject to the NAT configuration. The first server and/or the second server have the shared IP address or the dedicated IP address. For the shared IP address, the temporary IP address is needed to separate a migrating internet service from other internet services having the shared IP address. For the dedicated IP address, the migration from the first server to the second server is performed by directly changing the IP address to that of the second server.

The downtime of the host migration system may be substantially minimized and no unavoidable downtime may be experienced. The traffic of the first server, the relay server and/or the second server may be determined. Based on the traffic, the IP address propagation may be evaluated. It is possible to disable the first server and the relay server at the time that almost all requests are directed to the second server. Data loss may be substantially prevented and stable and safe hosting migration may be achieved. No sophisticated equipment, extensive labor and high expenses may be needed. The host migration system may experience substantially reduced downtime.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A host migration system for migrating an internet service to be hosted by a different server or an identical server at a different location, comprising:
   an authoritative name server comprising an address record that maps a first IP address to a selected domain name, in response to a domain name request for the selected domain name, the authoritative name server outputting the first IP address as a domain name response to the selected domain name based on the address record;
   a host migration platform, comprising:
      an origin server assigned with the first IP address and configured to host the internet service having the selected domain name at a selected location; and
      a migration server assigned with a second IP address and configured to host the internet service instead of the origin server such that the origin server at the selected location no longer provides the Internet service for the selected domain after completion of host migration to the migration server;
   wherein the authoritative name server is associated with the origin server and the migration server such that the authoritative name server provides the domain name response regarding the origin server and the migration server;
   wherein the address record stored in the authoritative name server is modified to map the second IP address to the selected domain name, and in response to the domain name request for the selected domain name, the authoritative name server outputs the second IP address as the domain name response to the selected domain name based on the modified address record;

wherein the first IP address is shared by multiple hosts running on the origin server and the origin server is further assigned with a temporary IP address in addition to the first IP address, and wherein the address record stored in the authoritative name server is modified to map the temporary IP address to the selected domain name instead of the first IP address prior to the modification of the address record to map the second IP address to the selected domain name, and in response to the domain name request for the selected domain name, the authoritative name server outputs the temporary IP address as the domain name response to the selected domain name based on the modified address record; and wherein during propagation of the mapping of the second IP address to the selected domain name, a data packet of a request for the selected domain name is redirected to the migration server, and the migration server which receives the redirected data packet of the request for the selected domain name, processes the data packet of the request for the selected domain name.

2. The host migration system of claim 1, wherein during the propagation of the mapping of the temporary IP address to the selected domain name, the origin server receives and processes the request directed to the first IP address and the request directed to the temporary IP address;

wherein the origin server is dissociated from the temporary IP address upon determination that there is no request directed to the temporary IP address; and wherein during the propagation of the mapping of the second IP address to the selected domain name, the origin server receives and redirects to the migration server the request directed to the temporary IP address, the migration server processing the redirected request and returning a response to the origin server.

3. The host migration system of claim 2, wherein subsequent to the mapping of the second IP address to the selected domain name, the origin server is configured so that the data packet of the request is formatted to have the temporary IP address as a source address and the second IP address as a destination address, thereby redirecting the data packet of the request directed to the temporary IP address to the migration server.

4. A host migration an internet service to be hosted by a different server or an identical server at a different location cormprising:

an authoritative name server comprising an address record that maps a first IP address to a selected domain name, in response to a domain name request for the selected domain name, the authoritative name server outputting the first IP address as a domain name response to the selected domain name based on the address record:

a host migration platform comprising:

an origin server assigned with the first IP address and configured to host the internet service having the selected domain name at a selected location; and a migration server assigned with a second IP address and configured to host the internet service instead of the origin server such that the origin server at the selected location no loner provides the internet service for the selected domain after completion of host migration to the migration server;

wherein the authoritative name server is associated with the origin server and the migration server such that the authoritative name server provides the domain name response the origin server and the migration server;

wherein the address record stored in the authoritative name server is modified to map the second IP address to the selected domain name, and in response to the domain name request for the selected domain name, the authoritative name server outputs the second IP address as the domain name response to the selected domain name based on the modified address record;

wherein the migration server is further assigned with a temporary IP address in addition to the second IP address; and wherein the address record stored in the authoritative name server is further modified to map the temporary IP address to the selected domain name instead of the first IP address prior to the mapping of the second IP address to the selected domain name, and in response to the domain name request for the selected domain name, the authoritative name server outputs the temporary IP address as the domain name response to the selected domain name based on the modified address record;

wherein the origin server receives the request directed to the first IP address and the migration server receives the request directed to the temporary IP address during the propagation of the mapping of the temporary IP address to the selected domain name; and wherein during propagation of the mapping of the temporary IP address to the selected domain name, a data packet of a request for the selected domain name is redirected to the origin server, and the origin server which receives the redirected data packet of the request for the selected domain name, processes the data packet of the request for the selected domain name.

5. The host migration system of claim 4, wherein during the propagation of the mapping of the temporary IP address to the selected domain name, the migration server is configured so that the data packet of the request is formatted to have the temporary IP address as a source address and the first IP address as a destination address, thereby redirecting the data packet of the request directed to the temporary IP address to the origin server, and the origin server processes the data packet and returns a response to the migration server;

wherein after propagation of the mapping of the second IP address to the selected domain name, the migration server is dissociated from the temporary IP address upon determination that there is virtually no request directed to the temporary IP address.

6. A method for migrating an internet service having a selected domain name to be hosted by a different server or an identical server at a different location, comprising:

establishing in an authoritative name server an address record that maps a first IP address to the selected domain name;

receiving and responding to a request for in the selected domain name at an origin server assigned with a first IP address and operating at a selected location;

copying a content of the origin server to a migration server assigned with a second IP address;

wherein the authoritative name server is associated with the origin server and the migration server such that the authoritative name server provides a domain name response regarding the origin server and the migration server;

assigning a temporary IP address to the origin server when the first IP address is shared by multiple hosts running on the origin server including a host for the selected domain name;

wherein the address record is modified to map the temporary IP address to the selected domain name to migrate the host for the selected domain name to be hosted by the different server; and receiving and processing at the origin server the data packet directed to the selected domain name during propagation of the mapping of the temporary IP address to the selected domain name;

modifying the address record stored in the authoritative name server to map the second IP address to the selected domain name, and in response to the domain name request for the selected domain name, providing the IP address as the domain name response to the selected domain name based on the modified address record;

redirecting a data packet to the migration server during propagation of the mapping of the second IP address;

processing the migration server which receives the redirected data packet during propagation of the second IP address; and operating the migration server to host the internet service instead of the origin server such that the origin server at the selected location no longer provides the internet service for the selected domain after completion of host migration to the migration server.

7. The migration method of claim 6, further comprising:

subsequent to the mapping of the second IP address to the selected domain name, configuring the origin server such that the data packet is formatted to have the temporary IP address as a source address and the second IP address as a destination address;

redirecting the data packet to the migration server; and removing the assignment of the temporary IP address to the origin server upon determination that there is virtually no request directed to the temporary IP address, 8. A method for migrating an internet service having a selected domain name to be hosted by a different server or an identical server at a different location, comprising:

establishing in an authoritative name server an address record that maps a first IP address to the selected domain name;

receiving and responding to a request for the selected domain name at an origin server assigned with a first IP address and operating at a selected location:

copying a content of the origin server to a migration server assigned with a second IP address;

wherein the authoritative name server is associated with the origin server and the migration server such that the authoritative name server provides a domain name response regarding the origin server and the migration server;

assigning a temporary IP address to the migration server when the second IP address is shared by multiple hosts running on the migration server including a host for the selected domain name; and wherein the address record is modified to map the temporary IP address to the selected domain name to migrate the host for the selected domain name to be hosted by the different server;

receiving the request at the origin server and the migration server after the address record is modified to map the temporary IP address to the selected domain name;

processing at the origin server the data packet directed to the selected domain name; and modifying the address record stored in the authoritative name server to map the second IP address to the selected domain name and in response to the domain name request for the selected domain name, providing the second IP address as the domain name response to selected domain name based on the modified address record; and operating the migration server to host the internet service instead of the origin server such that the origin server at the selected location no longer provides the internet service for the selected domain after completion of host migration to the migration server.

9. The migration method of claim 8, further comprising:

configuring the migration server such that the data packet is formatted to have the temporary IP address as a source address and the first IP address as a destination address; and redirecting the data packet directed to the temporary IP address to the origin server for processing.

10. The migration method of claim 9, further comprising receiving the request at the migration server after the address record is modified to map the second IP address to the selected domain name.

11. The migration method of claim 10, further comprising removing the assignment of the temporary IP address to the migration server upon determination that there is virtually no request directed to the temporary IP address.

12. The migration method of claim 11, further comprising setting the address record assigned to the selected domain name at a new authoritative name server, the new authoritative name server replacing the authoritative name server.

* * * * *